Figure 1:
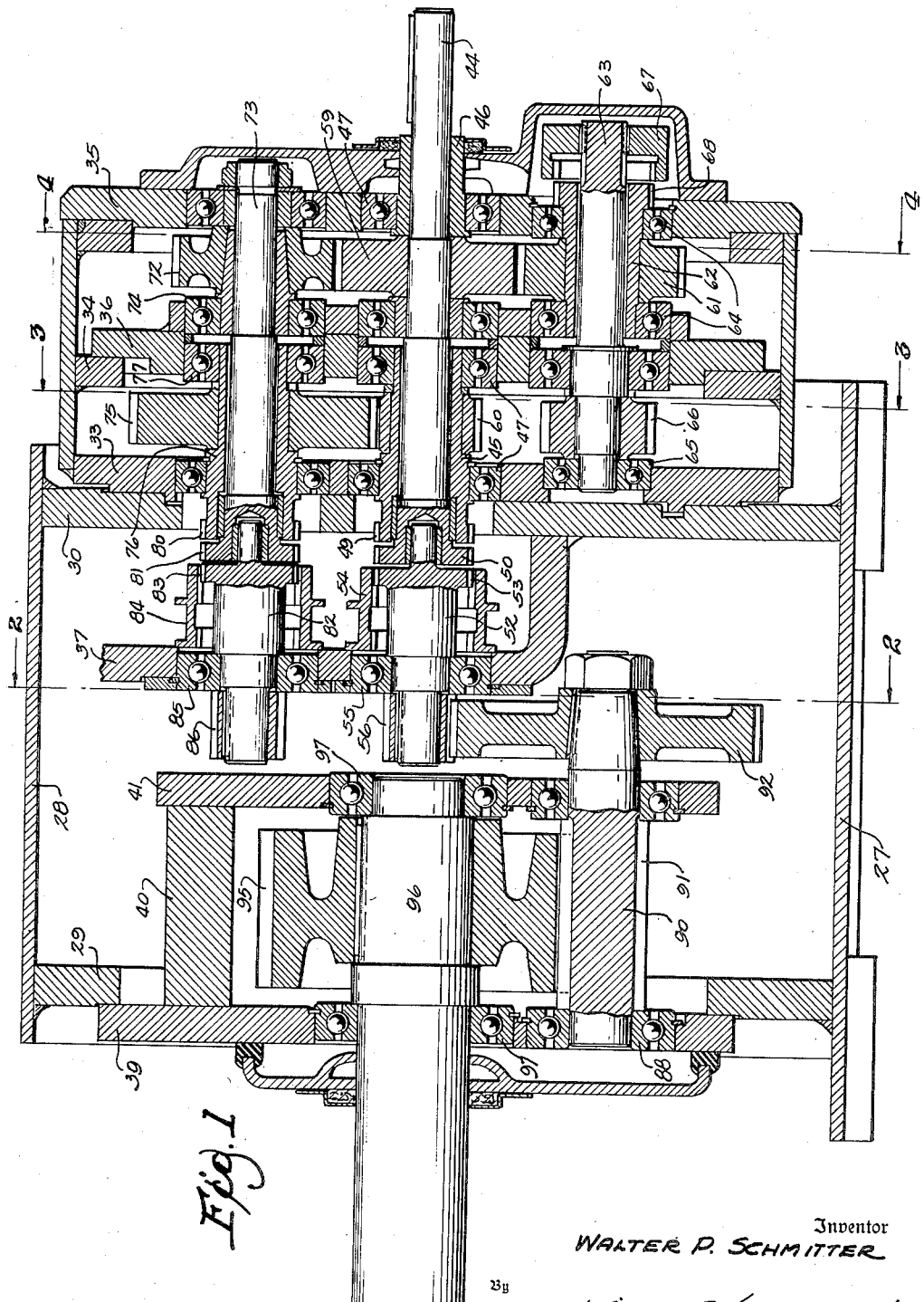

Nov. 23, 1954   W. P. SCHMITTER   2,694,940
MULTISPEED TRANSMISSION
Filed Sept. 30, 1949   5 Sheets-Sheet 1

Inventor
WALTER P. SCHMITTER
By
Miles Kenninger
Attorney

Nov. 23, 1954

W. P. SCHMITTER 2,694,940

MULTISPEED TRANSMISSION

Filed Sept. 30, 1949

5 Sheets-Sheet 2

Inventor
WALTER P. SCHMITTER

By Miles Henninger
Attorney

Nov. 23, 1954    W. P. SCHMITTER    2,694,940
MULTISPEED TRANSMISSION
Filed Sept. 30, 1949    5 Sheets-Sheet 4
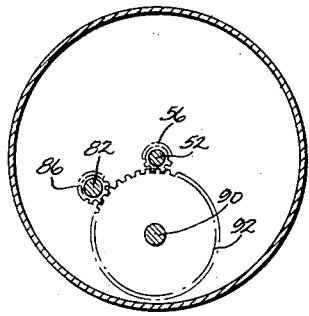
Fig. 12
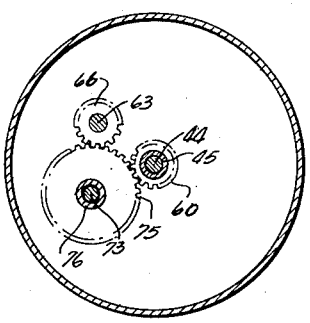
Fig. 13
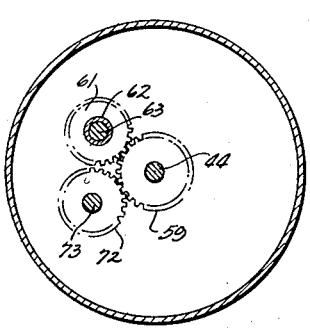
Fig. 14
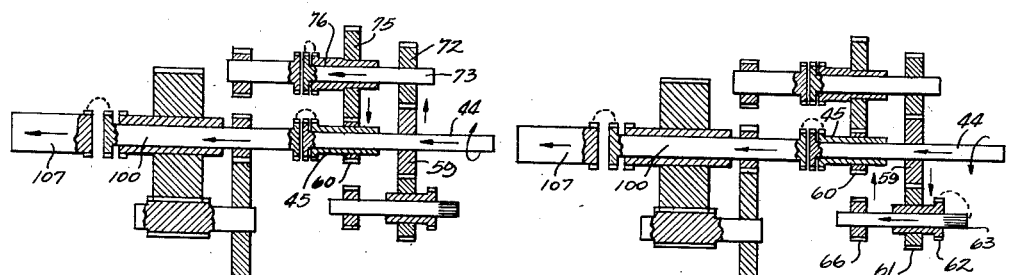
Fig. 15
Fig. 17
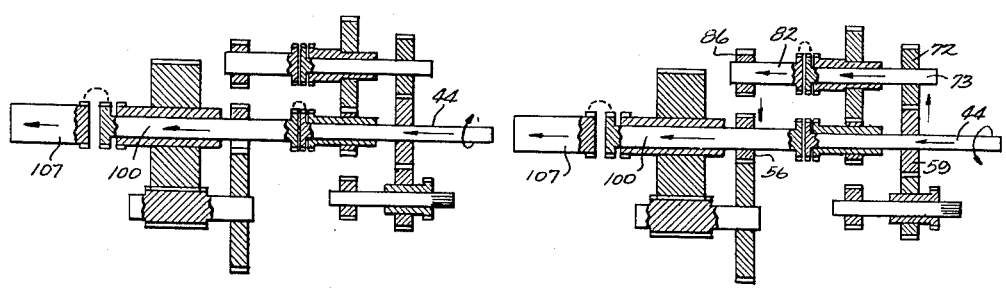
Fig. 16
Fig. 18
Inventor
WALTER P. SCHMITTER
By Miles Kenninger
Attorney Inventor
WALTER P. SCHMITTER
By Miles Kenninger
Attorney United States Patent Office 2,694,940
Patented Nov. 23, 1954

2,694,940

MULTISPEED TRANSMISSION

Walter P. Schmitter, Milwaukee, Wis., assignor to The Falk Corporation, Milwaukee, Wis., a corporation of Wisconsin Application September 30, 1949, Serial No. 118,776

18 Claims. (Cl. 74—359)

The herein disclosed invention relates to improvements in power transmissions for obtaining a multiplicity of speeds and particularly to transmissions of the type in which all the shafts are parallel and the gears are always in mesh.

In constant-mesh gear transmissions for obtaining a multiplicity of speeds, friction clutches are usually used to produce a variety of gear combinations. However, such clutches will slip under some operating conditions and, particularly where material quantities of power are to be transmitted, require considerable maintenance work. Further, such transmissions were heretofore each designed for a particular set of operating conditions and could not be assembled merely by use of standard parts in various relationships to provide a number of transmissions producing different numbers of speeds. Hence, none of such transmissions provided one or more sub-assemblies common to the various transmissions of a series so that a minimum number of parts could be manufactured to standard specifications and stocked for use in a number of different transmissions.

It is, therefore, an object of the present invention to provide multiple speed transmissions of the constant-meshed gear type employing only positively engageable and disengageable clutches designed for operation under various conditions dependent on the assembly of the other elements forming the various transmissions in a series delivering different speeds.

Another object of the invention is to provide a series of multi-speed constantly meshed gear type of power transmissions in which substantially all of the parts of the series of transmissions are standard and in which at least some of the sub-assemblies in the several members of such series of transmissions are identical for all of the transmissions in the series.

A further object of the invention is to provide a series of gear transmissions for deliverying power at a multiplicity of speeds and in the same direction of rotation dependent on the combination of clutches engaged in the transmission and on the direction of rotation of the input shaft.

And a further object of the invention is to provide a multi-speed power transmission of relatively simple and cheap construction and of relatively small size, in which the parts are rugged and of proven reliability and require only minimum maintenance, and which may be readily manufactured for positively transmitting any desired quantity of power.

Objects and advantages other than those above set forth will be apparent from the following description when read in connection with the accompanying drawing in which:

Fig. 1 is a cross-sectional view on an axial plane, of a transmission for producing a total of six different speeds.

Figure 2:
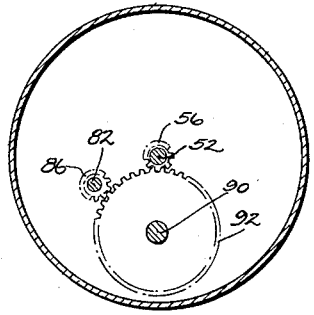
Figure 3:
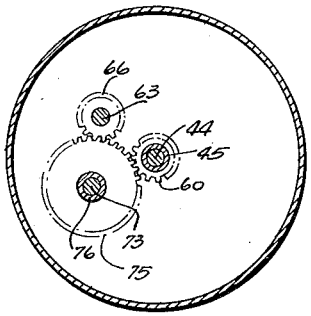
Figure 4:
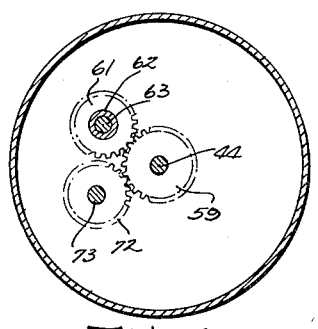

Figs. 2, 3 and 4 diagrammatically show the spatial relationship of various gears, and which cannot properly be shown in Fig. 1.

Figure 5:
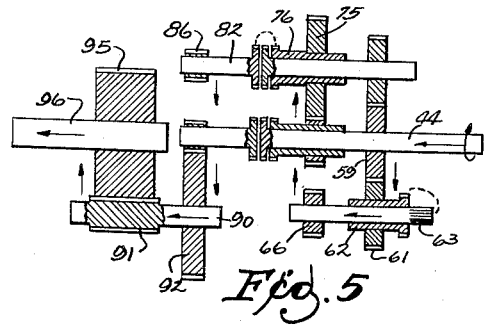
Figure 8:
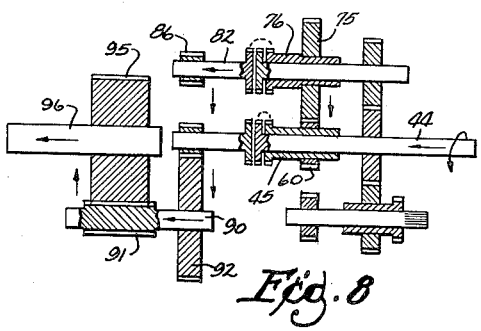
Figure 6:
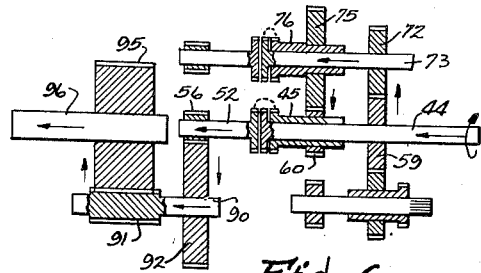
Figure 9:
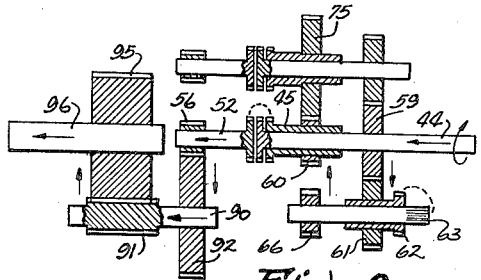
Figure 7:
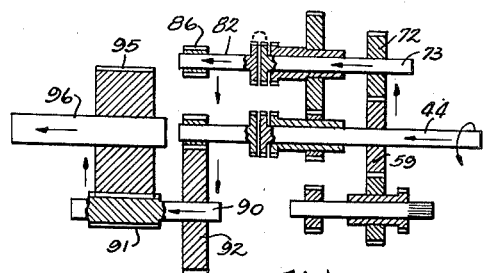
Figure 10:
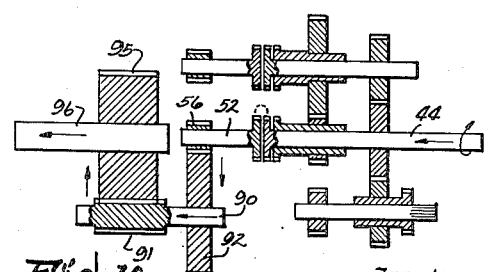

Figs. 5 to 10, inclusive, are diagrams illustrating the paths of power flow through the six-speed transmission at various speeds, the lowest speed being shown in Fig. 5 and the speeds increasing progressively from such lowest speed to the highest speed for which the position of the parts is shown in Fig. 10.

Figure 11:
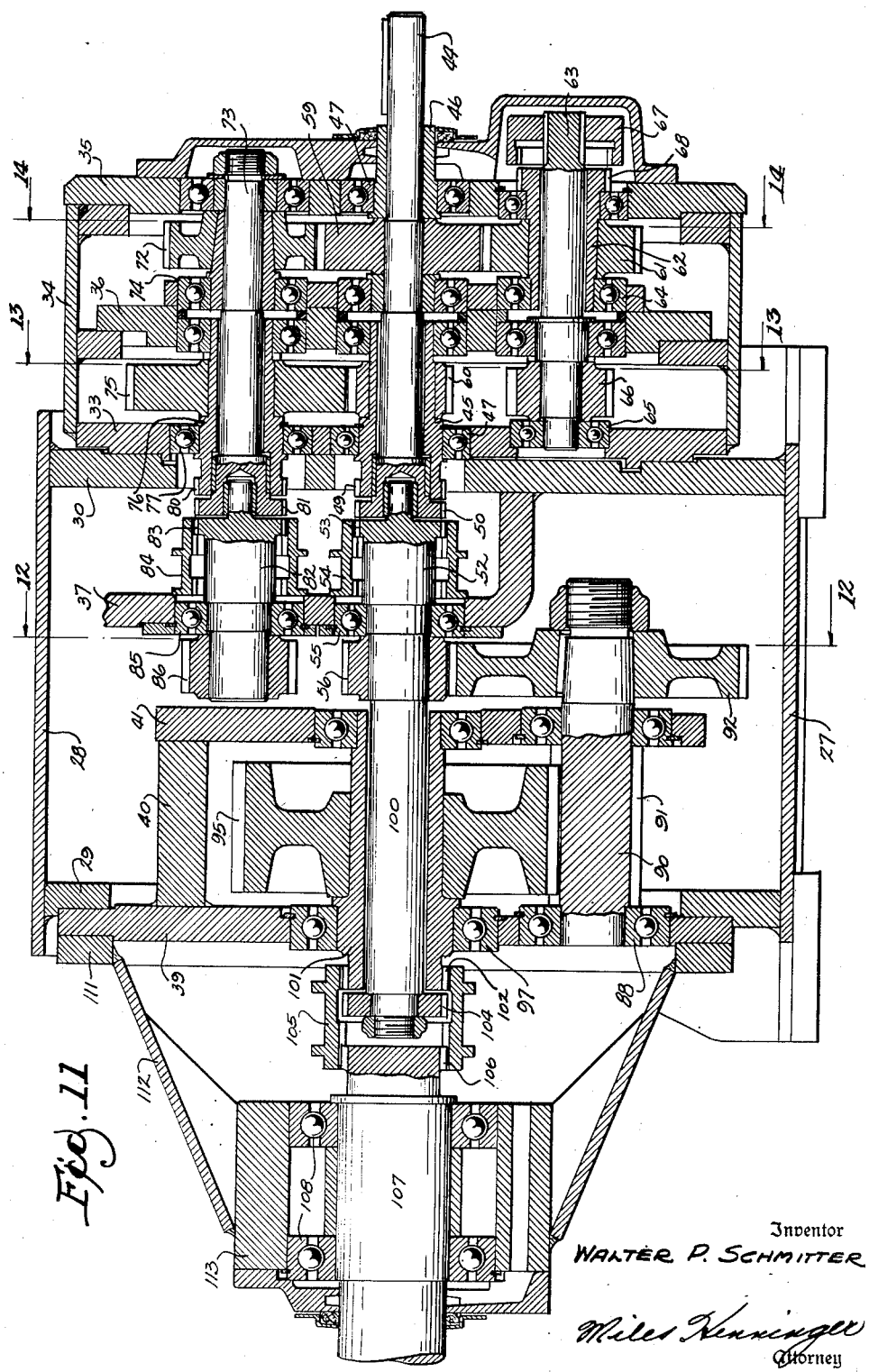
Figure 19:
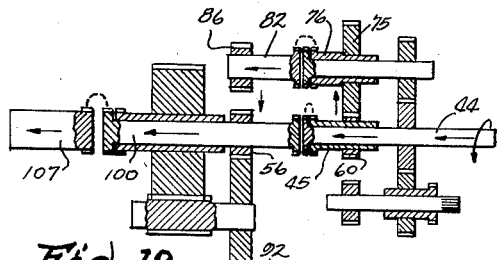
Figure 23:
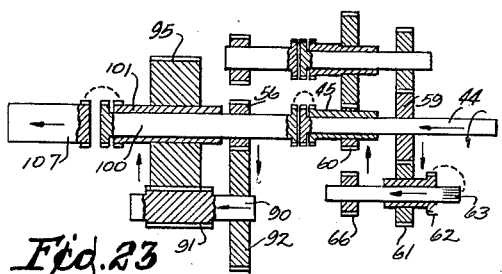
Figure 20:
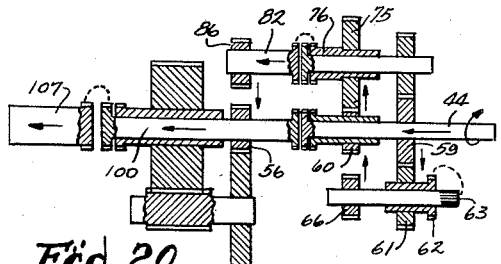
Figure 24:
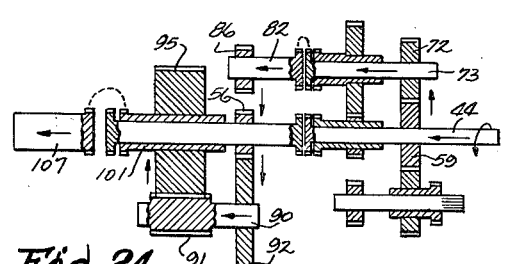
Figure 21:
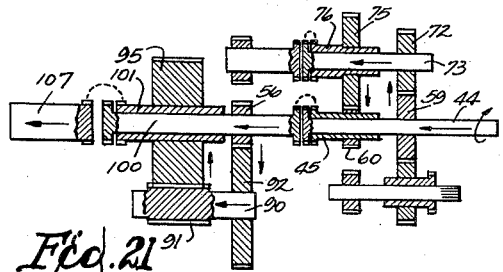
Figure 25:
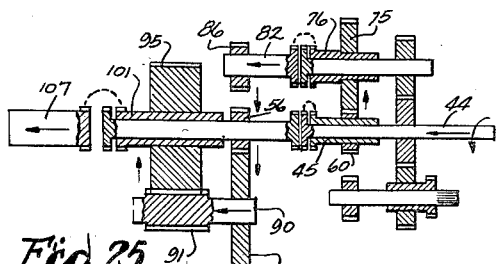
Figure 22:
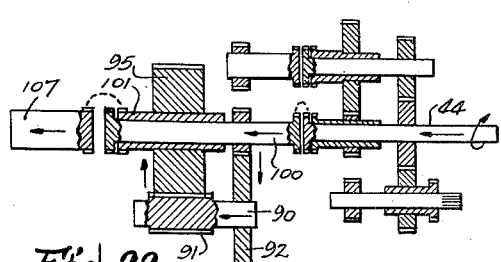

Fig. 11 is a cross-sectional view on an axial central plane, of a transmission for producing a total of twelve different speeds.

Figure 26:
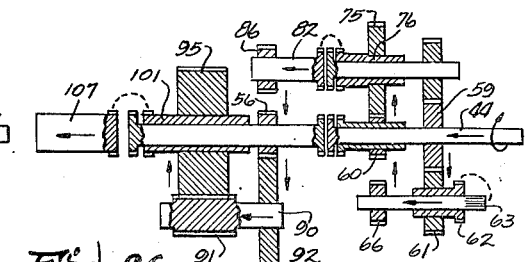

Figs. 12 and 13 diagrammatically show the spatial relationship of various gears of which such relationship does not appear in Fig. 11; and Figs. 15 to 26, inclusive, diagrammatically and severally illustrate the various paths of flow of power through the twelve-speed transmission, the lowest speed being shown in Fig. 15 and the speeds increasing progressively to the highest speed shown in Fig. 26.

The present transmissions severally include similar main and auxiliary casings, and a casing extension in the transmission having the higher number of speeds. The main casing provides internal brackets on which some of the shafts and gearing are mounted in the main casing. The auxiliary casing and casing extension are mounted on and extend from the main casing. The auxiliary casing carries and encloses the several input gearing trains and the casing extension is required only to furnish support for the output shaft in the twelve-speed transmission. All of the casings are fabricated from plates so that a minimum of fitting need be done and is simply and quickly performed. All of the shafts are parallel so that the plate apertures for the various bearings are easily kept in alignment.

The main casing encloses an output gear train with an aixally located output shaft and a second shaft vertically below the casing axis. The main casing also encloses a number of intermediate gears meshing with the output gear train and severally driving such train. One intermediate shaft is on the axis of the combined casing while a second shaft is below and to one side of such axis. In the six-speed transmission, the final output gear is on the output shaft, while in the twelve-speed transmission such gear is on a sleeve about a shaft other than the output shaft so that the output gear may deliver power to the output shaft or so that power may be delivered to the output shaft by a path of power flow excluding such gear.

The auxiliary casing encloses an axial input shaft and two counter-shafts parallel to the input shaft. Some of the gears in the input sub-assembly are fixed directly on the shafts of such sub-assembly, while others of such gears are fixed on sleeves partially enclosing the shafts.

One jaw or dental clutch is included in each of the identical input assemblies. The six-speed transmission includes two identical jaw or dental clutches for connecting the input gearing and the intermediate gearing, while the twelve-speed transmission employs three identical jaw or dental clutches, the third clutch being a part of the output structure. All of the clutches are identical in both transmissions and three of the clutches in each transmission are similarly placed to be operable by similar control means in each instance. Any one of three combinations of shaft and sleeve connections can be made by each of the latter-mentioned three and four clutches.

Referring particularly to the six-speed transmission shown in Figs. 1 to 10, inclusive, 27 designates a substantially rectangular base plate on which is fixed a substantially U-shaped side wall member 28 of a main casing. A ring 29 and a plate 30 are fixed to the base plate and the side wall, the plate 30 completing one end of the main casing. An auxiliary casing is formed by an end plate 33 mounted on the main casing end plate 30 and having fixed thereto a substantially cylindrical side wall member 34 to which is fastened an end plate 35 and a plate 36 intermediate the plates 33 and 35 to enclose the input gearing to be described. The auxiliary casing end plate 33 coacts with a bracket 37 extending from the main casing end plate 30 toward the center of the main casing to provide support for intermediate gearing to be described. Another bracket structure is formed by a plate 39 fixed on the main casing end plate 29 and having spacers 40 extending toward the center of the main casing to support a plate 41 for mounting the shafts and gearing of the output gear train of the transmission. It will be noted that the above casing structure is identical in both embodiments of the present invention.

The input or driving shaft 44 has mounted thereon sleeves 45 and 46 by which the shaft is supported in bearings 47, the sleeve 45 having one end 49 thereof toothed to form a portion of a first jaw or dental coupling or clutch. The end of the input shaft 44 adjacent the toothed end 49 of the sleeve 45 is also toothed as shown at 50 and is formed with a socket to receive an end of a shaft 52 coaxial with shaft 44 and to form one bearing for the shaft 52. Shaft 52 has teeth 53 formed therein at the end adjacent the toothed end of input shaft 44. The teeth 49, 50 and 53 are selectively engageable by the teeth of a clutch sleeve 54 upon operation of such sleeve by means well known and therefore not shown. Shaft 52 is also supported by a bearing 55 in the bracket 37 and has fixed thereto a gear 56. The shaft 52, 53 and gear 56 are not a part of the input gear train assembly and are herein termed intermediate gearing.

The input shaft 44 has fixed thereon a gear 59 and the sleeve 45 on such shaft has fixed thereon a gear 60. Gear 59 is constantly in mesh with a gear 61 on a sleeve 62 about a lower counter-shaft 63 in bearings 64. The shaft 63 is supported in bearings 65 in the auxiliary casing intermediate plate 36 and end plate 33, and has fixed thereto a gear 66. One end of shaft 63 slidably supports a clutch sleeve 67 engageable with teeth 68 on the sleeve 62 thus providing a second dental or jaw clutch operable by known means not shown.

The input gear 59 is also constantly in mesh with a gear 72 mounted on an upper counter-shaft 73 partially supported in bearings 74 in the auxiliary casing plates, and the input shaft gear 60 is always in mesh with a gear 75 mounted on a sleeve 76 about a portion of shaft 73 and supported in bearings 77. One end of the sleeve 76 is toothed as at 80 to provide a portion of a third dental or jaw clutch in cooperation with teeth 81 on shaft 73. The end of the shaft 73 adjacent the teeth 81 is socketed and provides a bearing for receiving and supporting one end of a shaft 82 having teeth 83 forming a portion of the third dental or jaw clutch. The third clutch is completed by a toothed sleeve 84 selectively engageable with the teeth 80, 81 and 83 upon movement of the sleeve by the usual means which is not shown. Shaft 82 is also supported in a bearing 85 in bracket 37 and has fixed thereto a gear 86 for a purpose to be described. The shaft 82 and gear 86 form another portion of the intermediate gearing.

The diagrams in Figs. 3 and 4 show the actual relationship in space, of the shaft 44, 63 and 73 and the gears thereon, gears 60 and 66 being always in mesh with gear 75 but not with each other and gears 59, 62 and 72 being all in mesh with one another. Hence, it is apparent that there is no gap in the input gear trains as would appear from consideration of Fig. 1 only. It will be noted also that the above structure is identical in both embodiments of the inventions herein shown.

Considering now the output end of the transmission, the bracket structure 39, 40 and 41 has bearings 88 in which is mounted a shaft 90 having gears 91 and 92 fixed thereon. The gear 91 meshes with a gear 95 mounted directly on a shaft 96 in bearings 97 in the bracket, such shaft being the output shaft of the transmission. By reference to the diagram of Fig. 2, it will be seen that the gears 56 and 86 are constantly in mesh with gear 92 but are not in mesh with one another, there being hence no gap in the transmission because of the spaced relation of the shafts 50, 82 and 90 as would otherwise appear from a consideration of Fig. 1 only.

From the foregoing it will be noted that in the transmission shown the drive shaft 44 and counter-shaft 73 are interconnected through different sized gears 59 and 72 so that these shafts rotate at different speeds and so that by connecting one or the other of them to the gear 92 through the alternatively operable clutches 54 or 84 and the connected pinions 56 or 86, the gear 92 and the speed reduction gear train of which it forms a part may be driven at either of two speeds.

It will be further noted that in the transmission shown the interconnected gears 60 and 75 are alternatively connectable to one or the other of the shafts 44 and 73 through the clutch elements 49—50 or 80—81, and that they are also alternatively connectable to the gear 92 through the clutches 84 or 54, so that these gears may thus be interposed as a driving connection between either of these shafts and the gear 92 to thereby effect operation of the latter at either of two speeds in addition to the two speeds afforded by the above noted direct connection between these shafts and this gear.

It will also be further noted that in the transmission shown the interconnected gears 60 and 75 are also releasably connectable to the drive shaft 44 through the clutch controlled gearing 61—66 in a manner to change the rate of operation of those gears, so as to effect operation of the gear 92 at either of two additional speeds whenever these gears, thus driven, are alternatively connected to gear 92 through one or the other of the clutches 54 or 84.

The novel combination of parts just described thus provides a multi-speed transmission of highly compact form readily attachable to the power input end of the speed reducer housing 28 in a manner to effect operation of the reduction gearing 92—20—95 thereof at any of six different speeds.

Referring now to Figs. 5 to 10, inclusive, the straight arrows indicate the power flow paths for the various speeds while the arrows curved about shaft 44 show the direction of power supply to the six-speed transmission, the direction of rotation of the output shaft being always the same. In the following Table I, the input shaft 44 and power delivery shaft 96 and gears 91, 12 on shaft 90 and gear 95 on the output shaft 96 are parts of each power flow path and are accordingly not included in the table.

Table I.—Six-speed transmission

| Speed | Gears | Sleeve | Shaft | Gears | Sleeve | Gears | Shaft | Sleeve | Gear | Shaft | Gear |
| --- | --- | --- | --- | --- | --- | --- | --- | --- | --- | --- | --- |
| 1 | 59, 61 | 62 | 63 | 66, 75 | 76 | | 82 | 45 | | 52 | 56 |
| 2 | 59, 72 | | 73 | | 76 | 75, 60 | | 45 | | 52 | 56 |
| 3 | 59, 72 | | 73, 82 | 86 | | | | | 86 | | |
| 4 | | 45 | | 60, 75 | 76 | | 82 | | | 52 | 56 |
| 5 | 59, 61 | 62 | 63 | | | 66, 75, 60 | | 45 | | 52 | 56 |
| 6 | | | | | | | | | | | |

In the structure shown in Figs. 11 to 26 the speed reducer has been modified in a manner to multiply at the output end thereof the number of speeds afforded by the multi-speed transmission above described. In this instance the shaft 52 carrying the gear 56 has been extended through the gear 95, as indicated at 100, the output shaft 96 of Fig. 1 has been replaced by a hollow shaft or sleeve 101 for the support of gear 95 to which the latter is fixed, an output shaft 107 has been added in substantial alignment with shafts 52 and 100, and provision has been made for operatively connecting the shaft 107 to either of the shafts 52 or 100, alternatively, so that the shaft 107 may be driven from the multi-speed mechanism either through the speed reduction gearing 92—91—95 or independently thereof.

The shaft 107 is shown journalled in longitudinally spaced bearings 108 seated in a tubular support 113 carried by a rigid conical structure 112 equipped with an appropriate mounting ring 111 attached to the end disk 39 of the speed reducer housing 28. An axially movable clutch sleeve 105 is internally splined at one end for permanent driving engagement with teeth 106 on the end of shaft 107 and similarly splined at its other end for alternative engagement with teeth 102 on the end of shaft 101 or with a toothed disk 104 fixed to the end of shaft extension 100.

The arrangement is such that, when the clutch member 105 is engaged with the toothed disk 104 on shaft 100, the shaft 107 may be directly driven from the gear 56 at any of the six speeds provided by the multi-speed driving mechanism, and when the clutch member 105 is engaged with the teeth 102 on shaft 101, the shaft 107 may be driven through the speed reduction gearing 92, 91, 95 at six different speeds within a lower speed range and hence differing from the six speeds available when the shaft 107 is coupled to the shaft 100.

It will thus be noted that by the modifications introduced in the structure of Fig. 11 the speed reducer therein shown is capable of transmitting power at twice the number of output speeds that are available from the structure shown in Fig. 1.

Throughout the several Figs. 15 to 26 the output shaft 107 rotates in the same direction, the curved arrows indicating the direction of rotation of the input shaft 44, and the straight arrows indicating the path of the power flow in each instance. The arrangement of parts for the lowest output speed is illustrated in Fig. 15 and the several arrangements illustrated in the other of these views provide progressively increased speeds in the numerical order of the several figures.

The following Table II indicates by reference numerals the several active elements through which the power is transmitted in each of the twelve different speed arrangements illustrated, except that reference to the input and output shafts 44 and 107 has been omitted since they are common to all of the arrangements.

*Table II.—Twelve-speed transmission*

| Speed | Gears | Sleeve | Shaft | Gears | Shaft | Sleeve | Gears | Shaft | Gears | Sleeve | Shaft | Gears | Shaft | Gears | Sleeve |
|---|---|---|---|---|---|---|---|---|---|---|---|---|---|---|---|
| 1 | 59, 72 | | 73 | | | 76 | | | 75, 60 | 45 | 100 | | | | |
| 2 | | | | | | | | | | | 100 | | | | |
| 3 | 59, 61 | 62 | 63 | 66, 75, 60 | | | | | | | 100 | | | | |
| 4 | 59, 72 | | 73 | | 82 | | 86, 92, 56 | 100 | | 45 | 100 | | | | |
| 5 | | 45 | | 60, 75 | | 76 | | 82 | 86, 92, 56 | | 100 | | | | |
| 6 | 59, 61 | 62 | 63 | 66, 75 | | 76 | | 82 | 86, 92, 56 | | 100 | | | | |
| 7 | 59, 72 | | 73 | | | 76 | 75, 60 | | | | 100 | | | | |
| 8 | | | 100 | 56, 92 | | | | 90 | 91, 95 | 45 | 100 | 56, 92 | 90 | 91, 95 | 101 |
| 9 | 59, 61 | 62 | 63 | 66, 75, 60 | | 45 | | 100 | 56, 92 | 101 | | | 90 | 91, 95 | 101 |
| 10 | 59, 72 | | 73 | | 82 | | 86, 56, 92 | 90 | 91, 95 | 101 | | 90 | 91, 95 | | 101 |
| 11 | | 45 | | 60, 75 | | 76 | | 82 | 86, 56, 92 | | | 90 | 91, 95 | | 101 |
| 12 | 59, 61 | 62 | 63 | 66, 60, 75 | | 76 | | 82 | 86, 56, 92 | | | 90 | 91, 95 | | 101 |

Only dental or jaw clutches are employed in either of the two present embodiments of the invention thus obtaining positive drive under all conditions, only two different clutch constructions being utilized therein. One clutch is identical in the input assembly of both transmissions. The six-speed transmission employs three similar clutches and the twelve-speed transmission employs four similar clutches, and such clutches are identical in both embodiments herein disclosed. Corresponding clutches are identically related to other portions of the structure in both modifications so that the same clutch control means may be used therein and such clutches are operable in the same manner which avoids confusion.

A series of multi-speed transmissions are obtained in which many of the parts and even entire sub-assemblies are identical as is particularly the case with the input sub-assembly or unit. The several transmissions in a series are assembled and disassembled as units so that a faulty unit may be readily replaced by a new unit which has been factory-tested.

The casing of the main unit includes internal brackets of which only one requires only slight modification for use in either the six-speed or the twelve-speed transmissions herein described. For producing a twelve-speed transmission from the parts used in the six-speed transmission, the intermediate gears are modified only by a substitution for one of their shafts, which substituted shaft then becomes the final shaft in the output gear train. The output gear train is modified only by the addition of a sleeve for mounting one of the gears, the provision of another clutch, an outboard bearing and an output shaft which may be clutched to either the final shaft or the gearing of the output train. Hence, the major portions of the output sub-assembly or unit are also identical for the several transmissions and the transmission with the higher number of speeds, requires only the substitution of a few parts in and the addition of a few parts to an otherwise standard sub-assembly. A minimum number of different parts is thus required for producing an entire series of transmissions.

Simplicity of construction is increased and the stocking of parts is minimized by the utilization of a single double jaw clutch in the output unit for engaging anyone of a number of gear trains therein and by making either one of two intermediate gears independently engageable and disengageable by one of two triple jaw clutches. The bearings are limited to a few sizes only thus further minimizing the number of individual parts requiring storing for the assembly of transmissions to cover different numbers of speed changes.

Although but two embodiments of the present invention have been illustrated and described, it will be apparent that various changes and modifications may be made therein without departing from the invention as defined in the appended claims.

I claim:

1. An input unit for connection with a main unit of a plurality of power transmissions of the constantly meshing gear type, the unit comprising three parallel shafts, pairs of gears severally about said shafts, one gear of each of said pairs being fixed and one of the gears of each of said pairs being rotatable relative to its shaft, a clutch for connecting a gear of one of said pairs of gears on one of said shafts with one of the said gears on another of said shafts for varying the paths of power flow through the unit, and clutches for connecting two of said shafts with the main unit of a transmission whereby power is delivered from the input unit at one of six different speeds.

2. An input unit for connection with a main unit of a plurality of power transmissions of the constantly meshing gear type, the unit comprising an input shaft, two countershafts, said shafts being mounted in spaced parallel relation, pairs of gears severally about each of said shafts, one gear of each of said pairs of gears being fixed and one of the gears of each of said pairs of gears being rotatable relative to its shaft, a clutch for connecting one of the pairs of said gears on one of said countershafts with one of the said gears on said input shaft for varying the paths of power flow through the unit, a clutch for connecting said input shaft with the main unit of a transmission, and a clutch for connecting one of said counter-shafts with the main unit of a transmission, the clutches being individually and simultaneously connectible whereby power is delivered from the input unit at one of six different speeds.

3. An input unit for connection with a main unit of a plurality of power transmissions of the constantly meshing gear type, the unit comprising an input shaft, two counter-shafts, said shafts being rotatable in parallel relation, pairs of gears severally about said shafts, one gear of each of said pairs of gears being fixed and the other gear of each of said pairs of gears being rotatable relative to its shaft, the fixed one of said gears on said input shaft being in mesh with the rotatable one of said gears on one of said counter-shafts and with the fixed one of said gears on the other of said counter-shafts, a clutch for connecting one of the pair of said gears on the said one of said counter-shafts with one of said gears on said input shaft for varying the paths of power flow through the unit, a clutch for connecting said input shaft with the main unit of a transmission, and a clutch for connecting one of said counter-shafts with the main unit of a transmission, the clutches being individually and simultaneously connectible whereby power is delivered from the input unit at one of six different speeds.

4. An input unit for connection with a main unit of a plurality of power transmissions of the constantly meshing gear type, the unit comprising an input shaft, two counter-shafts in parallel relation with said input shaft, pairs of gears severally about each of said shafts, one gear of each of said pairs of gears being fixed and the other gear of each of said pairs of gears being rotatable relative to its shaft, the fixed one of said gears on said input shaft constantly meshing with the one fixed and the one relatively rotatable gear of said pairs of gears severally on said counter-shafts, the relatively rotatable one of said gears on one of said counter-shafts being in mesh with the relatively fixed one of said gears on said input shaft and with the fixed one of said gears on the other of said counter-shafts, a clutch for connecting one of the pair of said gears on one of said counter-shafts with one of said gears on said input shaft for varying the paths of power flow through the unit, a clutch for connecting said input shaft with the main unit of a transmission, and a clutch for connecting one of said counter-shafts with the main unit of a transmission, the clutches being individually and simultaneously connectible whereby power is delivered from the input unit at one of six different speeds.

5. An input unit for a plurality of power transmissions of the constantly meshing gear type, the unit comprising three parallel shafts, sleeves severally about portions of said shafts and rotatable relative thereto, pairs of gears severally about said shafts, one gear of each said pair of gears being fixed on its shaft and one gear of each said pair of gears being fixed on said sleeve on its shaft, each of said gears being constantly in mesh with one gear of another of said pairs of gears, a clutch for connecting one of one pair of said gears with one of another pair of said gears for varying the paths of power flow through the unit, and clutches for severally coacting with and for alternate connection with two of said shafts and with said sleeves thereon whereby power is delivered from the unit at one of six different speeds.

6. An input unit for a plurality of power transmissions of the constantly meshing gear type, the unit comprising a casing including parallel end walls and an intermediate wall, aligned bearings in the walls of said casing for coacting in pairs severally in the end walls and the intermediate wall, the several sets of said aligned bearings being parallel with one another, three parallel shafts rotatably mounted in said bearings, sleeves severally about portions of two of said shafts and rotatable relative thereto, said shaft portions and said sleeves being severally mounted in the two pairs of said bearings in each aligned set of bearings, pairs of gears on each of said shafts and severally mounted on said shaft portions and said sleeves, a clutch for connecting one of said gears on one of said shafts with one of a pair of said gears on another of said shafts, and clutches for severally coacting with and for alternate connection with two of said shafts and with the said sleeves thereon whereby power is delivered from the unit at one of six different speeds.

7. In a gear transmission of the constant-meshed gear type, an input shaft, two counter-shafts parallel with the input shaft, sleeves severally about portions of each of the shafts and rotatable relative thereto, pairs of gears severally about each of the shafts and the sleeves thereon, one gear of each pair of gears being fixed on its shaft and one gear of each pair of gears being fixed on the sleeve about its shaft, one of the gears of each of the pairs of gears being constantly in mesh with a gear of another pair of gears, and another of the gears of two of the pairs of gears being constantly in mesh with the other gear of the third pair of gears, a clutch for connecting one of the counter-shaft sleeves with one of the gears on the input shaft, and clutches for severally coacting with and for alternate connection with two of the shafts and with the sleeves thereabout, the positions of the clutches coacting in delivering power from the transmission at one of six different speeds.

8. In a gear transmission of the constant-meshed gear type, an input shaft, two counter-shafts parallel with the input shaft, sleeves severally about portions of each of the shafts and rotatable relative thereto, pairs of gears severally about each of the shafts and the sleeves thereon, one gear of each pair of gears being fixed on its shaft and one gear of each pair of gears being fixed on the sleeve about its shaft, one of the gears of each of the pairs of gears being constantly in mesh with a gear of another pair of gears and another of the gears of two of the pairs of gears being constantly in mesh with the other gear of the third pair of gears, a clutch for connecting one of the counter-shaft sleeves with one of the gears on the input shaft, and clutches for severally coacting with and for alternate connection with the input shaft and the other counter-shaft and with the sleeves thereon whereby power is delivered severally and jointly from the input shaft and the other counter-shaft and the sleeves thereon dependent on the co-acting positions of the several clutches and at any one of the six different speeds.

9. A main sub-assembly for a multi-speed transmission of the constant-meshed gear type comprising a casing, gearing including a pair of parallel shafts, one of the shafts extending through an end wall of the said casing, clutches for severally connecting the shafts with a source of power, and gears severally fixed on the shafts, and output gearing including a first shaft, gears fixed on the first shaft with one of the gears constantly in mesh with one of the first said gears, a sleeve on the extending shaft, a gear on the sleeve and meshing with one of the gears on the first said shaft, a power delivery shaft, and a clutch for alternate connection of the extending shaft and the sleeve thereon with the power delivery shaft.

10. In a multi-speed gear transmission, an input unit comprising a plurality of power output shafts, a power output sleeve on each of the shafts, and clutches for several connection with an output shaft and its sleeve, and a main unit comprising a plurality of intermediate shafts, clutches for severally connecting the intermediate shafts with one input unit shaft and its sleeve, gears severally fixed on the intermediate shafts, one of the intermediate shafts being extended beyond the intermediate gear thereon, and output gearing including a first shaft, gears fixed on the first shaft with one of the first shaft gears constantly in mesh with each of the intermediate gears, a sleeve about the extended intermediate shaft and rotatable relative thereto, a gear fixed on the last mentioned sleeve and meshing with the other gear of the first shaft, a power delivery shaft, and a clutch for alternately connecting the extended shaft and the sleeve thereon with the power delivery shaft.

11. A multi-speed transmission of the constant-meshed gear type, an input unit comprising an input shaft, two counter-shafts, sleeves severally about portions of each of the shafts and rotatable relative thereto, a gear fixed on each of the shafts, a gear fixed on each of the sleeves, a clutch for connecting a gear on the input shaft with one gear on one of the counter-shafts, and a main unit comprising two intermediate shafts, a clutch for severally connecting the said input shaft and its sleeve with one of the intermediate shafts, a clutch for severally connecting one of the counter-shafts and its sleeve with the other intermediate shaft, gears severally fixed on the intermediate shafts, one of the intermediate shafts being extended beyond the gear thereon, and output gearing including a first shaft, gears fixed on the first shaft with one of the first shaft gears constantly in mesh with each of the intermediate gears, a sleeve about the extended intermediate shaft and rotatable relative thereto, a gear fixed on the last said sleeve and meshing with the other gear on the first shaft, a power delivery shaft, and a clutch for alternately connecting the extended shaft and the sleeve thereon with the power delivery shaft, the positions of the clutches coacting in providing power from the input unit at one of six speeds and in delivering power from the transmission at one of twelve speeds.

12. A variable speed attachment for a speed reducer having a housing and speed reduction gearing journalled therein, said attachment comprising an auxiliary housing attachable to said speed reducer housing, two parallel shafts mounted in said auxiliary housing, interconnected gears within said auxiliary housing including a gear concentric with each of said shafts and rotatable independently thereof, and means including clutches operable for severally drivingly connecting said shafts directly with said speed reduction gearing and through said interconnected gears for thereby effecting operation of said speed reducer at any of a plurality of selected speeds.

13. A variable speed attachment for a speed reducer having a housing and speed reduction gearing journalled therein, said attachment comprising an auxiliary housing attachable to said speed reducer housing, a drive shaft and a second shaft journalled in said auxiliary housing and interconnected to operate at different speeds, interconnected gears in said auxiliary housing including a gear concentric with each of said shafts and rotatable independently thereof, and means including clutches operable for severally drivingly connecting said shafts directly with said speed reduction gearing and connecting said shafts jointly with said speed reduction gearing through said interconnected gears to thereby effect selective operation of said speed reducer at any of four speeds.

14. A variable speed attachment for a speed reducer having a housing and speed reduction gearing journalled therein, said attachment comprising an auxiliary housing attachable to said speed reducer housing, a drive shaft and a second shaft journalled in said auxiliary housing and interconnected to operate at different speeds, interconnected gears in said auxiliary housing including a gear concentric with and rotatable on each of said shafts, means including clutches operable to drivingly connect said shafts severally and directly with said speed reduction gearing and jointly connecting said shafts through said interconnected gears with said speed reduction gearing to thereby effect operation of said speed reducer at any of selected four speeds, and additional clutch controlled gearing in said auxiliary housing operable to vary the speed of said interconnected gears to thereby further vary the output speed of said speed reducer.

15. A variable speed attachment for a speed reducer having a housing and speed reduction gearing therein, said attachment comprising an auxiliary housing attachable to said speed reducer housing, a drive shaft and a second shaft journalled in said housing to operate at different speeds, interconnected gears in said auxiliary housing releasably and selectively connectable to said driving and second shafts, clutch controlled gearing operable to vary the rate of operation of said interconnected gears, and means including clutches operable to selectively and drivingly connect said speed reduction gearing severally with one of said drive or second shafts and said interconnected gears.

16. In a multi-speed transmission the combination of a driven rotary element, a drive shaft, a second shaft, said shafts being constantly interconnected to operate at different speeds, interconnected gears releasably and selectively connectable to said drive and second shafts, clutch controlled gearing operable to vary the rate of operation of said interconnected gears, and means including clutches operable to severally and selectively operably connect said driven element to either said drive shaft or to said second shaft or to said interconnected gearing.

17. In a multi-speed transmission the combination of a driven rotary element, a drive shaft, a second shaft, said shafts being constantly operably interconnected for rotation at different speeds, interconnected gears including a gear concentric with each of said shafts and rotatable independently thereof, clutch controlled means operable for drivingly and selectively connecting either of said shafts directly with said driven element or through said interconnected gears, and additional clutch controlled gearing operable to vary the rate of operation of said interconnected gears.

18. In a multi-speed transmission the combination of a driven rotary element, a drive shaft, a second shaft operably interconnected with and operable at different speeds from said drive shaft, interconnected gears releasably and selectively connectable with said shafts, and clutch controlled means operable to drivingly and selectively connect said driven element with either of said shafts or with said interconnected gears to thereby effect operation of said driven element at any of a plurality of speeds selectively.

References Cited in the file of this patent

UNITED STATES PATENTS

| Number | Name | Date |
|---|---|---|
| 984,730 | Young | Feb. 21, 1911 |
| 1,589,267 | Toomey | June 15, 1926 |
| 1,701,403 | Coykendall | Feb. 5, 1929 |
| 2,235,485 | Jones | Mar. 18, 1941 |
| 2,257,747 | Jones | Oct. 7, 1941 |
| 2,301,448 | Peterson | Nov. 10, 1942 |
| 2,328,519 | Wahlberg | Aug. 31, 1943 |
| 2,400,830 | Kinnueau | May 21, 1946 |
| 2,443,313 | Gerst | June 15, 1948 |
| 2,464,479 | Avila | Mar. 15, 1949 |
| 2,487,735 | Sherman | Nov. 8, 1949 |
| 2,513,286 | Cook | July 4, 1950 |
| 2,518,781 | Hindmarch | Aug. 15, 1950 |
| 2,553,376 | Le Tourneau | May 15, 1951 |

FOREIGN PATENTS

| Number | Country | Date |
|---|---|---|
| 425,884 | Germany | Mar. 2, 1926 |
| 498,893 | Great Britain | Jan. 16, 1939 |
| 512,718 | Great Britain | Sept. 25, 1939 |
| 562,743 | Germany | Oct. 28, 1932 |
| 577,438 | Great Britain | May 17, 1946 |
| 604,178 | Great Britain | June 29, 1948 |
| 644,483 | Germany | May 5, 1937 |